(No Model.)

C. LEIBY.
HOLDBACK FOR VEHICLES.

No. 512,117. Patented Jan. 2, 1894.

WITNESSES
Trow Peterson
C. E. Humphrey

INVENTOR
Clark Leiby.
By ATTORNEY C. R. Humphrey

UNITED STATES PATENT OFFICE.

CLARK LEIBY, OF SHARON, OHIO.

HOLDBACK FOR VEHICLES.

SPECIFICATION forming part of Letters Patent No. 512,117, dated January 2, 1894.

Application filed April 10, 1893. Serial No. 469,721. (No model.)

*To all whom it may concern:*

Be it known that I, CLARK LEIBY, a citizen of the United States, residing at Sharon, in the county of Medina and State of Ohio, have invented a certain new and useful Improvement in Holdbacks, of which the following is a specification.

My invention has relation to improvements in that class of irons used on vehicle thills, and commonly termed hold-backs, the object and purpose of which is to form a hook to which to attach the hold-back or "quarter" straps of the harness.

The object of my invention is to provide a new and improved hook of the class designated, which will permit of the ready insertion and removal of the quarter strap, and which shall prevent its escape from the same by accident.

To the aforesaid purpose my invention consists in the peculiar and novel construction, arrangement and combination of parts, hereinafter described, and then specifically pointed out in the claims, reference being had to the accompanying drawings, forming a part of this specification.

Figure 1:
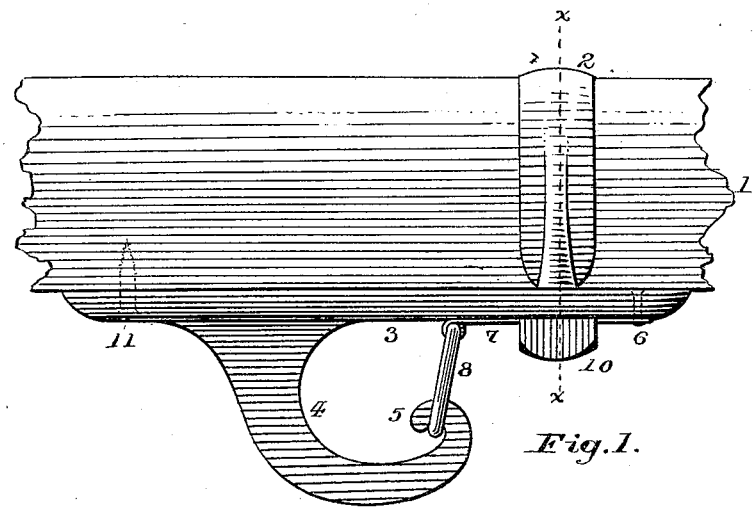
Figure 2:
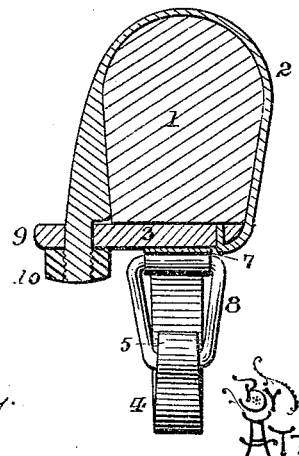

In the accompanying drawings, in which similar reference numerals indicate like parts in the different views: Figure 1, is a side elevation of my improved hold-back iron; Fig. 2, a transverse section of the same at the line $x$, $x$, of Fig. 1; and Fig. 3, a side elevation from the opposite side of Fig. 1, showing a slightly modified arrangement of parts.

Referring to the drawings, 1 is a portion of a thill to which is attached by a clip 2, a plate 3, integral with which is a hook 4, the end 5, of which, is curved inward and backward.

Attached to the plate 3, by a rivet 6, is a spring 7, having a loop or eye at its free end, in which is mounted a rocking link 8, arranged to enter the returned end 5, of the hook 4, by the elasticity of the spring 7. The clip 2, has one end inserted in an opening in the plate 3, and is thence bent around the edge of the plate and about the thill 1, its opposite end being screw-threaded and passing through an ear 9, of the plate 3, where it is retained by the nut 10. By this arrangement and construction of the clip, a practically smooth surface is presented on the inside of the thill, which will not injure the side of the horse. The opposite end of the plate 3, is secured by a small screw 11.

From the peculiar construction and arrangement of the parts, the link 8, can only be released by direct pressure near its outer end sufficient to bend the spring 7, and to permit it to pass over the returned end 5, of the hook 4, and hence the liability to being accidentally released is reduced to a minimum.

Figure 3:
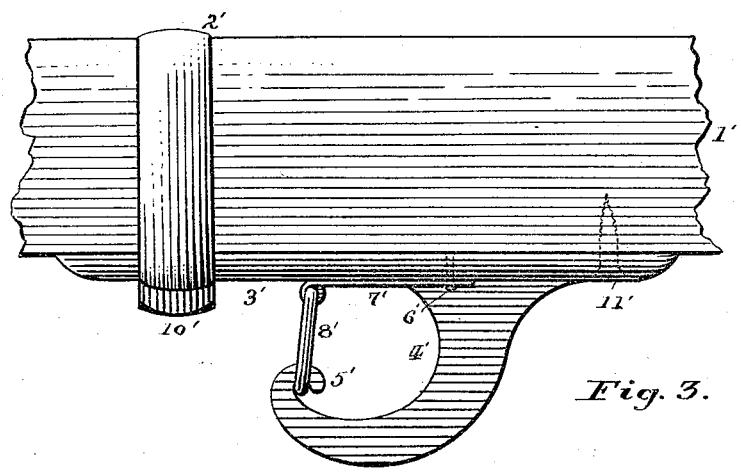

The modification shown in Fig. 3, only differs from the device shown in Fig. 1, in having the spring placed in an opposite direction from the former, it being recessed to pass the hook a short distance, and is riveted on each side thereof.

The reference numerals represent the same parts.

I claim as my invention—

1. A hold-back hook having a returned end, combined with a link connected with a hook support by a spring, and adapted to engage the returned end of the hook, substantially as shown and described.

2. The plate and the hook integral therewith, and having a returned end, combined with the spring attached to said plate, and the link pivotally mounted in said spring and arranged to engage the returned end of said hook, substantially as shown and described.

In testimony that I claim the above I hereunto set my hand.

CLARK LEIBY.

In presence of—
SAMUEL SANTEE,
GEORGE A. SANTEE.